Sept. 28, 1948.　　　　A. WOLF　　　　2,450,265
METHOD OF LOGGING BORE HOLES
Filed April 4, 1944
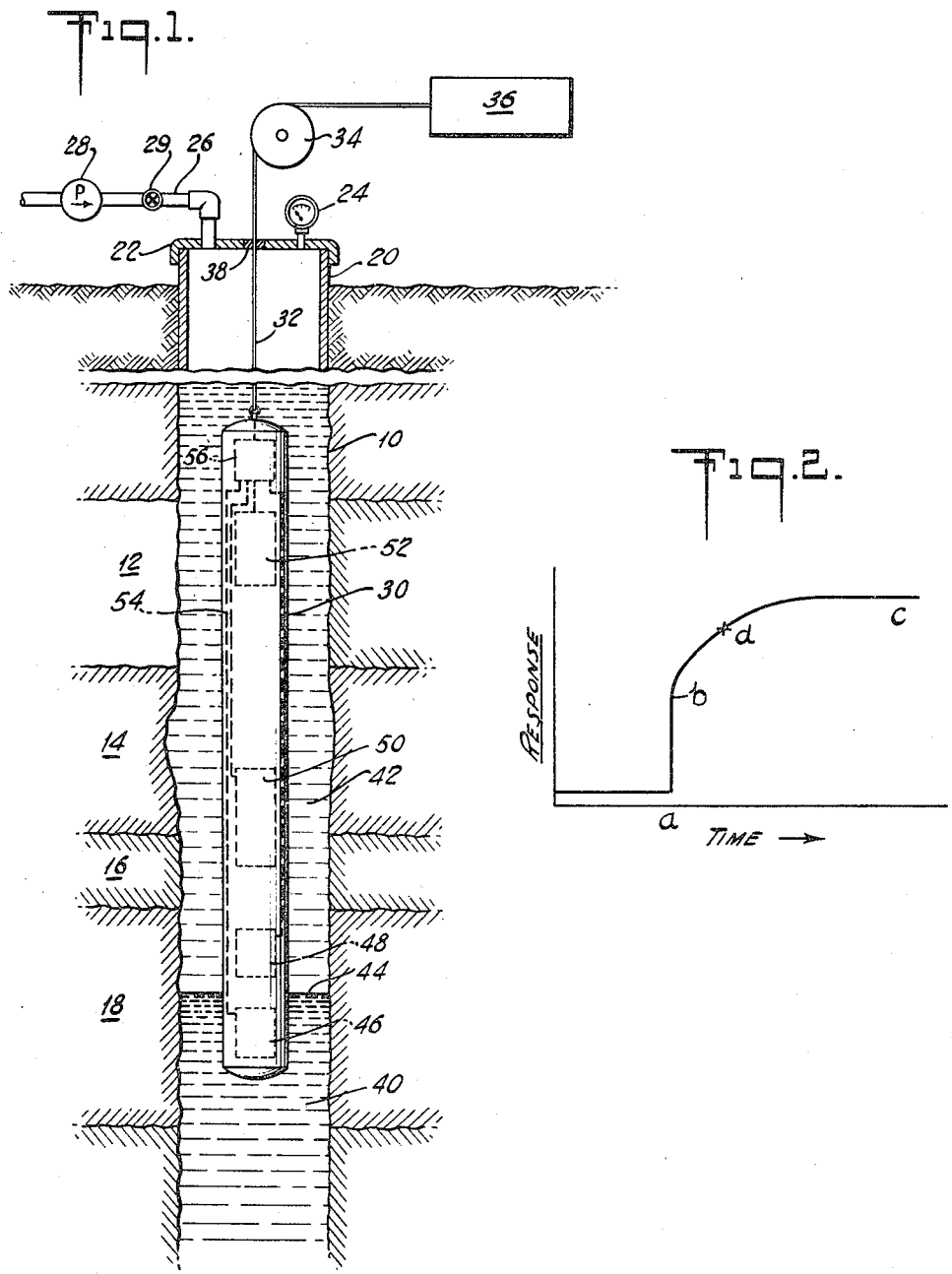
INVENTOR
ALEXANDER WOLF.
BY
ATTORNEY Patented Sept. 28, 1948

2,450,265

UNITED STATES PATENT OFFICE 2,450,265

METHOD OF LOGGING BOREHOLES

Alexander Wolf, Houston, Tex., assignor to The Texas Company, New York, N. Y., a corporation of Delaware Application April 4, 1944, Serial No. 529,454

15 Claims. (Cl. 250—83)

1

This invention relates to well or bore hole logging and more particularly to a method of ascertaining the location and the permeability and porosity of underground formations traversed by a bore hole by measuring a characteristic of the formations as influenced by the penetration thereinto of a fluid under pressure. For example, measurements may be made of the increase in radioactivity of such formations subjected to penetration by a fluid under pressure containing a radioactive substance.

The principal object of the invention is to provide a method of this type in which connate fluids, i. e., fluids from the formations themselves, are kept away from the walls of the formation, the radioactivity of which is being measured so that these fluids will not affect the penetration of the formations by the fluid containing the radioactive substance and the determination of the amount or extent of such penetration.

It is well known that oil deposits commonly occur in the vicinity of highly porous structures or formations, but, aside from the obvious desirability of locating these structures in the search for oil, the permeability and porosity of the formations are important in other considerations. Thus, in designing equipment to be used in connection with oil producing, the size and nature of desalting and dehydrating equipment, the size of pumps required where water drive is used to force oil through the porous spaces into the well, etc., may depend to a large extent on the porosity and the permeability of the producing formation.

In a copending application of Gerhard Herzog and Alexander Wolf, Serial No. 529,487, filed concurrently herewith, now Patent No. 2,446,588, a method of determining the permeability and porosity of an underground formation is disclosed, in accordance with which method the bore hole, or a portion of the bore hole, opposite a formation to be examined is filled with a fluid containing a substance which is either naturally or artificially radioactive. A radiation detecting device suspended from a cable is lowered in the hole to a point opposite the formation to be studied and pressure is then applied to the liquid. If the formation is porous to any appreciable extent, some of the liquid containing the radioactive substance will be forced into the pore spaces of the formation, and, if the pressure on the liquid is maintained constant, the rate of flow of liquid into the formation and the attendant increase in radioactivity of the formation will be indica-

2 tive of the permeability of that formation. By means of the radiation detector in the hole, measurements are made of the radioactivity during the period when the liquid is passing into the formation, these measurements indicating the permeability of the formation. After the increase in radioactivity has ceased, the total amount of increase in radioactivity in the formation during the period when pressure was applied provides an indication of the porosity of the formation.

In another copending application of Gerhard Herzog, Serial No. 529,488, also filed concurrently herewith now Patent No. 2,443,680, another method of determining the permeability and porosity of a formation is disclosed, in which method a fluid containing a substance which will release gamma rays when bombarded with neutrons is placed in the hole and a gamma ray detecting device together with a source of neutrons is lowered through the hole to a point opposite the formation to be studied and pressure is then applied to the liquid. By means of the gamma radiation detector, measurements are made of the increase in radioactivity during the period when the liquid is passing into the pore spaces of the formation and also after the increase in radioactivity has ceased. These measurements indicate the permeability and the porosity, respectively, of the formation.

In the methods described in the preceding two paragraphs it is assumed that there is no connate fluid in the hole opposite the formation or formations to be examined and that the radioactive fluid in the hole extends downwardly either to the bottom of the hole or to a plug placed in the hole below the formations to be studied. There are, of course, instances where the connate fluid fills the hole to a point above the formations to be examined and in some cases it may be impracticable to bale out a sufficient quantity of the connate fluid to cause the liquid level to descend and remain below the formations to be examined while the measurements are being made.

In accordance with the present invention, a method is provided through the use of which substrata may be logged without the necessity of baling the connate fluid from the hole. In carrying out this invention a liquid lighter in weight than the connate liquid and containing a radioactive substance is placed in the hole so that it remains on top of the connate liquid. When making a continuous log of the hole or a section thereof, a radiation measuring instrument is placed in the radioactive liquid and pressure is applied to the radioactive liquid so that the liquid interface will be forced downwardly. The measuring instrument is caused to follow the interface and to maintain a predetermined position with respect thereto. Measurements are made of the pressure in the hole and also of the level of the connate fluid before the radioactive liquid is placed in the hole. During the logging operation the pressure in the hole and the height of the liquid therein will be measured continuously or at close intervals, and the response of the radiation detector is recorded continuously and correlated with the depth of the instrument in the hole. As was described with reference to the copending applications, Serial Nos. 529,487 and 529,488, the pressure placed on the radioactive liquid causes some of this liquid to pass into the pore spaces of the formations and the radiation detector in the hole measures the radioactivity of the surrounding formations at a predetermined time interval after the interface between the connate liquid and the radioactive liquid has, in its descent, passed the formation opposite the detector. This measurement of the rate of increase in the radioactivity of the formation due to the penetration by the radioactive liquid provides an indication of the permeability of the formation. After the formations have been logged downwardly, a suitable period of time is allowed to elapse for the establishment of equilibrium conditions; that is, until further increase in radioactivity of the formations due to penetration of the radioactive liquid has ceased and the instrument is then withdrawn. The readings of the radiation detector in its upward travel are indicative of the total increase in radioactivity of the formations and therefore of the porosity of these formations.

It is also contemplated that another radiation detector can be mounted in a fixed, predetermined relation with respect to the detector which has been described, this second detector being disposed closer to the liquid interface whereby the response of this second detector will be indicative, substantially, of the amount of radioactive fluid opposite the detector and thus of the diameter of the hole.

For a better understanding of the invention reference may be had to the accompanying drawing in which:

Figure 1 is a somewhat diagrammatic sectional elevation through a portion of a well or bore hole showing an instrument in the hole for making permeability and porosity measurements; and Figure 2 is a curve illustrating the response of the radiation detector when held at a fixed position while the pressure on the radioactive liquid in the hole is caused to increase.

With reference to the drawing, a bore hole 10 is shown as traversing several underground formations such as those indicated at 12, 14, 16, and 18. The upper portion of the hole may be provided with a casing 20 having a suitable casing head or closure 22. The casing head has attached thereto a pressure gauge 24 and a pipe 26 leading from a pump or compressor 28, the inlet of which may be connected to a suitable tank or vessel, not shown. An instrument indicated generally by the elongated, tubular housing 30 is suspended in the hole by means of a cable 32 which passes over the pulley or drum of a device 34 capable of measuring the amount of cable in the hole and thus the depth of the instrument 30. The cable 32 is provided with one or more electrical conductors serving to connect the instruments in the housing 30 with a suitable recording device 36 at the surface in a manner well known in the art. The device 36 may be a recording galvanometer and preferably is of a type capable of recording the responses of a plurality of radiation detectors disposed within the instrument housing 30. The cable 32 passes through a suitable gland or seal 38 in the casing head 22 to prevent leakage around the cable and the arrangement is such that, by means of the compressor 28, the pressure within the hole can be maintained constant or increased at any desired rate.

In Figure 1 the lower portion of the hole 10 is shown as containing connnate liquid 40 and above this liquid is another liquid 42 immiscible with and lighter than the liquid 40 and containing a radioactive substance, either in solution or suspension. In case oil is used as the liquid 42, radium naphthenate would be satisfactory as the radioactive material. The interface between the liquids 40 and 42 is indicated at 44.

The instrument housing 30 contains at least three, but preferably four, devices capable of detecting radiation such as gamma rays. Two of these radiation detectors 46 and 48 are disposed in slightly separated relation near the bottom end of the housing 30; another detector 50 is disposed somewhat above the detector 48, and the fourth detector 52 is shown as positioned near the upper end of the housing 30. Each of the radiation detectors is shown as connected by suitable wiring 54 to a preamplifier 56 at the upper end of the housing and the output of the preamplifier is conducted through the cable 32 to the recorder 36, as has been described.

Before the liquid 42 is placed in the well, the well is stabilized by shutting it in. The connate or well fluid 40 will rise to a height H above a producing formation such, for instance, as the formation 16, and the pressure within the casing as measured by the gauge 24 increases to P. Pressure within the producing formation $P_1$ can be calculated from the relation $$P_1 = P + Hd$$

where $d$ is the density of the liquid 40 and H can be measured by suitable means such as acoustic sounding. $P_1$ also can be measured directly, if desired, by means of a suitable bottom-hole pressure gauge. If the formation pressure $P_1$ is not too high, the well actually may be open to the atmosphere, in which case $$P_1 = Hd$$

As will be observed with reference to Figure 1, the detectors 46 and 48 are mounted in close proximity to each other and their purpose is to enable the operator to follow the interface 44 with the entire instrument 30 as the interface is depressed due to the application of increasing pressure to hole 10. Thus, in normal operation the detector 46 will be below the interface 44 so that it will be surrounded by the connate fluid 40 and the detector 48 will be surrounded by the liquid 42 containing the radio-active substance. The difference in the response of these two detectors obviously will be quite large and for this reason it will not be necessary in all instances that these two detectors be extremely sensitive.

The detector 50 is mounted above and fairly close to the detector 48, it being only sufficiently far from the interface 44 to assure that its response will not be affected materially by the connate liquid 40. While the interface 44 is being depressed, the detector 50 will traverse a point, for example the boundary between formations 16 and 18, soon after that point has been passed by the descending interface 44. Insufficient time will have elapsed for the radioactive liquid 42 to have penetrated appreciably into the formation opposite the detector 50, and it is clear, therefore, that variations in the response of the detector 50 will correspond to variations in the amount of the radioactive fluid 42 surrounding that detector and therefore to the variations in the diameter of the bore hole.

The detector 52 is mounted within the instrument housing 30 above the detector 50 and at a distance which will be determined by the speed of the operation, that is, the rate at which the interface 44 is depressed, the average rate of penetration of the liquid 42 into the formations, as well as other factors such as the sensitivity of the detector, etc. In any event, in its descent the detector 52 will pass any given point a known time interval after the passage of the fluid interface 44. This time interval in combination with the pressure in the hole and the difference between the response of detectors 50 and 52 provides a measure of the permeability of the formations traversed by the instrument. It is preferred that the radiation detectors 50 and 52 have high efficiencies, whereas, as stated hereinbefore, the detectors 46 and 48 may, if desired, have lower efficiencies.

Considering the operation of the process after the fluid 42 has been introduced into the bore hole and the instrument 30 lowered to a position such that the response of detectors 46 and 48 indicates that the interface 44 lies between these two detectors, the pressure in the hole is increased either by pumping more of the liquid 42 into the hole or preferably by pumping gas into the casing by means of the pump or compressor 28. The interface 44 will then descend and the instrument 30 will be lowered accordingly by observation of the response of the detectors 46 and 48. The pressure in the hole and the height of the liquid 42 will be measured continuously, or at close intervals, so that the pressure difference between the formations and the moving interface 44 will be known substantially at all times. The response of the detectors 50 and 52 will be recorded continuously in correlation to the depth of the instrument in the hole.

Let us consider what happens at any particular level: If, as an example, the fluid 42 contains a substance emitting gamma rays and the instruments 46, 48, 50 and 52 are gamma ray detectors, the response of an instrument such as the detector 52 located at that particular level would be substantially as is shown in Figure 2. Let us assume that the interface 44 is above the instrument 30 so that the detector 52 will be surrounded by the connate liquid 40 and that the instrument 30 remains at a fixed vertical position in the hole: the pump or compressor 28 is then started and the valve 29 opened so that either additional liquid 42, or a gas, is pumped into the well, thus raising the pressure therein. As long as the interface 44 is an appreciable distance above the detector 52, or, until the time $a$ in the graph of Figure 2, the response of this detector will merely indicate the normal gamma ray activity of the connate liquid and the surrounding formations, which activity is of course relatively low. As the interface continues to be depressed, it will reach the level of the detector 52, and with reference to Figure 2 the response of the detector will increase suddenly from $a$ to $b$. The magnitude of $b$ depends upon the diameter of the hole 10. Since the radioactivity of the liquid 42 is known, the magnitude of $b$ will be a measure of the hole size. If the formation opposite the detector 52 is at all porous, the radioactive liquid 42 will start to penetrate the formation and the response of the detector 52 will increase at a rate dependent on the rate of penetration of the liquid 42 into the formation and will finally become stable at some value $c$ dependent on the porosity of the formation. In Figure 2, the curve which starts upwardly from the point $b$ indicates the rate of penetration, i. e., the permeability of the formation, and the upper horizontal part $c$ of the curve indicates the porosity.

In the preceding paragraph it has been assumed that the instrument 30 remains at one predetermined level or depth in the hole 10. In the continuous logging of the hole, on the other hand, the instrument 30 will be caused to follow the interface 44 in its descent through observation of the response of the two detectors 46 and 48. As has been explained hereinbefore, the detector 50 being only a short distance above the interface will measure the amount of the liquid 42 which surrounds the detector, and consequently will indicate variations in the diameter of the hole. On the other hand, the detector 52, which is maintained at a greater distance above the interface 44, will measure the radioactivity at some point such as $d$ on the curve, a known time interval after $a$. The response of the detector 52 will, of course, include the radioactivity of the surrounding liquid 42 and, by subtracting the response of the detector 50 from the response of the detector 52 making an allowance for the difference in depth of the two detectors, an indication will be had of the permeability of the formation opposite detector 52.

After the formations have been logged downwardly, as described above, a suitable period of time may be allowed to elapse for the establishment of the equilibrium condition indicated by $c$ of Figure 2. The instrument 30 is then pulled upwardly and the readings of the detector 52 on the way up are indicative of the porosity of the formations, after suitable correction for the readings obtained at the time $a$.

In all of the foregoing it was assumed that the liquid 42 will remain on top of the connate fluid 40; that is, that the liquid 42 will be lighter than the liquid 40. It is obvious that the process can be carried out where the liquid added to the hole is heavier than the connate liquid, as by introducing the heavier radioactive liquid at the bottom of the bore hole through a suitable string of pipe in the hole, and provided that the instrument 30 is turned upside down.

It has also been assumed in the preceding description that the liquid 42 is radioactive, either naturally or artificially, and that the detectors are responsive to gamma radiation. It is contemplated that fluids other than those which are radioactive can be introduced into the formations and that the detecting instruments will have a characteristic reaction to the added fluid. The essential feature of the process is the moving of the fluid interface along the well bore ahead of the instrument and keeping the instrument, or parts of it, in a known spaced relation to the interface. If desired, as in the case where there is little variation in the diameter of the bore hole, the detector 50 may be omitted. Likewise, the detectors 46 and 48 instead of being responsive to gamma radiation may respond to some other characteristic of the liquids 40 and 42 such as the electrical resistivity of these liquids, the main purpose of these detectors, as explained above, being to indicate that the interface 44 is between them. Detectors 46 and 48 may be replaced by a single detector; in this case the interface 44 between fluids 40 and 42 can be located by placing this detector in such a position that the output of this detector is intermediate between the output obtained in fluid 40 and that obtained in fluid 42.

Obviously many modifications and variations of the invention, as hereinbefore set forth, may be made without departing from the spirit and scope thereof, but only such limitations should be imposed as are indicated in the appended claims.

I claim

1. A method of determining the nature of underground formations traversed by a bore hole containing liquid from the formations, which comprises placing in the hole a second liquid containing a radioactive substance, said second liquid being immiscible in and having a gravity different from said formation liquid, applying pressure to the hole, passing a detector responsive to radiation from said second liquid through that portion of the hole containing the second liquid, moving the interface between said liquids along the hole ahead of said detector and maintaining the detector in predetermined spaced relation with respect to said interface.

2. A method of determining the nature of under-ground formations traversed by a bore hole containing liquid from the formations which comprises placing in the hole a second liquid containing a radioactive substance, said second liquid being immiscible in and having a gravity different from said formation liquid, applying pressure to the hole, passing a detector responsive to radiation from said second liquid through that portion of the hole containing the second liquid, moving the interface between said liquids along the hole ahead of said detector and maintaining the detector in predetermined spaced relation with respect to said interface while measuring the response of said detector, the pressure in the hole and the level of the liquid in the hole.

3. A method of determining the nature of under-ground formations traversed by a bore hole containing liquid from said formations which comprises placing in the hole on top of said formation liquid a fluid lighter than and immiscible in said connate liquid, said fluid containing a radioactive substance, applying pressure to the hole, passing a detector responsive to radiation from said lighter fluid through the hole so as to measure the increase in said radiation due to penetration of the lighter liquid into said formations, moving the liquid interface along the hole ahead of said detector, and maintaining said detector in predetermined spaced relation to said interface.

4. A method of determining the nature of substrata traversed by a bore hole containing connate liquid which comprises placing a liquid lighter than said connate liquid and containing a radioactive substance in said hole, applying pressure to said hole to force a portion of the radioactive liquid into the surrounding substrata and to simultaneously force downwardly the interface between said liquids, continuously determining the radioactivity of the radioactive liquid at a point just above the descending interface as a measure of the size of the hole, and continuously measuring the radioactivity of that portion of the substrata a predetermined greater distance above the descending interface.

5. A method of determining the nature of substrata traversed by a bore hole containing connate liquid which comprises placing a liquid lighter than said connate liquid and containing a radioactive substance in said hole, applying pressure to said hole to force a portion of the radioactive liquid into the surrounding substrata and to simultaneously force downwardly the interface between said liquids, continuously measuring the radioactivity of that portion of the substrata a predetermined fixed distance above the descending interface, and measuring the radioactivity of said substrata a predetermined time interval after said first measurement.

6. A method of determining the nature of substrata traversed by a bore hole containing connate liquid which comprises placing a liquid lighter than and immiscible in said connate liquid and containing a radioactive substance, in said hole, applying pressure to said hole to force a portion of the radioactive liquid into the surrounding substrata and to simultaneously force downwardly the interface between said liquids, and continuously measuring the radioactivity of that portion of the substrata a predetermined fixed distance above the descending interface, while measuring the size of the hole just above said interface, the pressure in the hole and the level of said radioactive liquid.

7. A method of determining the nature of substrata traversed by a bore hole containing connate liquid which comprises placing a liquid lighter than and immiscible in said connate liquid and containing a radioactive substance, in said hole, increasing the pressure in the hole so as to force a portion of the radioactive liquid into the surrounding substrata to impart an increased radioactivity to said substrata, the interface between the connate liquid and the radioactive liquid being forced to descend with the increasing pressure, and measuring the increased radioactivity of the substrata at any point a predetermined time interval after that point has been passed by the descending interface.

8. A method of determining the nature of substrata traversed by a bore hole containing connate liquid which comprises placing a liquid lighter than and immiscible in said connate liquid and containing a radioactive substance, in said hole, gradually increasing the pressure in the hole so as to force a portion of the radioactive liquid into the surrounding substrata to increase the radioactivity of said substrata, the interface between the connate liquid and the radioactive liquid being forced to descend with the increasing pressure, measuring the increased radioactivity of the substrata at any point a predetermined time interval after that point has been passed by the descending interface, continuously measuring the size of the hole at a point just above the descending interface, and subsequently measuring the total increase in said radioactivity after further increase has ceased.

9. A method of determining the nature of underground formations traversed by a bore hole containing liquid from said formations which comprises placing in the hole on top of said formation liquid a lighter liquid containing a radioactive substance, applying pressure to the hole to force some of said lighter liquid into the surrounding substrata, passing a radiation detector through the hole containing the radioactive liquid, moving the liquid interface along the hole ahead of said detector while and maintaining said detector in predetermined spaced relation to said interface, and noting the response of said detector as an indication of the increased radioactivity of said substrata due to the presence therein of said liquid containing the radioactive substance.

10. A method of determining the nature of underground formations traversed by a bore hole containing liquid from said formations which comprises placing in the hole a liquid having a gravity different from that of said formation liquid and containing a radioactive substance, applying pressure to the hole, passing a radiation detector through the hole containing the radioactive liquid, moving the liquid interface along the hole ahead of said detector while maintaining said detector in predetermined spaced relation to said interface, and simultaneously measuring the size of the bore hole at a point between the moving interface and said radiation detector.

11. A method of determining the nature of substrata traversed by a bore hole containing connate liquid which comprises placing a liquid lighter than and immiscible in said connate liquid and containing a radioactive substance, in said hole, gradually increasing the pressure in the hole so as to force a portion of the radioactive liquid into the surrounding substrata to increase the radioactivity of said substrata, the interface between the connate liquid and the radioactive liquid being forced to descend due to the increasing pressure, continuously lowering a radiation detector to measure the said increased radioactivity of the substrata, said detector being maintained in predetermined spaced relation above the descending interface and subsequently, after further increase in the radioactivity of the substrata has ceased, raising the detector while measuring the total increase in radioactivity of the strata opposite the detector.

12. A device for determining the nature of underground formations traversed by a bore hole containing connate liquid and a lighter liquid above said connate liquid, comprising a housing, means for passing said housing through the hole, a detector in said housing for measuring a characteristic of the surrounding formations caused by the penetration into said formations of a portion of said lighter liquid, means in said housing responsive to characteristics of said connate liquid and said lighter fluid for indicating when a part of said housing is at the same level as the fluid interface, and means for recording the response of said detector and said indicating means.

13. A device for determining the nature of underground formations traversed by a bore hole containing connate fluid and a lighter, radioactive fluid on top of said connate fluid, comprising a housing, means for passing said housing through the hole, a detector in said housing for measuring the radioactivity of the surrounding formations caused by the penetration into said formations of a portion of said radioactive fluid, means in said housing responsive to characteristics of said connate fluid and said radioactive fluid for indicating the position of said housing with respect to the fluid interface, and means for recording the response of said detector and said indicating means.

14. A device for determining the nature of underground formations traversed by a bore hole containing connate liquid and a lighter, radioactive liquid above said connate liquid, comprising a housing, means for passing said housing through the hole, a detector in said housing for measuring the radioactivity of the surrounding formations caused by the penetration into said formations of a portion of said radioactive liquid, means in said housing below said detector for indicating when the lower part of said housing is at the same level as the fluid interface, said last-named means comprising a pair of radiation detectors mounted in vertical spaced relation, one of said detectors being normally disposed below and the other above said interface, and means for recording the response of said detectors.

15. A device for determining the permeability of underground formations traversed by a bore hole containing connate liquid and a lighter, radioactive liquid above said connate liquid, comprising a housing, means for passing said housing through the hole, a detector in said housing for measuring the radioactivity of the surrounding formations caused by the penetration into said formations of a portion of said radioactive liquid, a second detector in said housing for measuring the radioactivity of the liquid surrounding that detector and thus the size of the bore hole, means in said housing below said detector for indicating when the lower part of said housing is at the same level as the fluid interface, said last-named means comprising a pair of radiation detectors mounted in vertical spaced relation, one of said detectors being normally disposed below and the other above said interface, and means for recording the response of all of said detectors.

ALEXANDER WOLF.

REFERENCES CITED

The following references are of record in the file of this patent:

UNITED STATES PATENTS

| Number | Name | Date |
| --- | --- | --- |
| 2,273,215 | Neufeld | Feb. 17, 1942 |
| 2,348,810 | Hare | May 16, 1944 |
| 2,352,993 | Albertson | July 4, 1944 |
| 2,358,945 | Teichmann | Sept. 26, 1944 |
| 2,385,378 | Piety | Sept. 25, 1945 |